United States Patent [19]
Fidric et al.

[11] Patent Number: 5,313,480
[45] Date of Patent: May 17, 1994

[54] STABILIZATION APPARATUS AND METHOD FOR AN SFS

[75] Inventors: Bernard G. Fidric, Los Angeles County; David F. Libman, Ventura County, both of Calif.

[73] Assignee: Litton Systems, Inc., Woodland Hills, Calif.

[21] Appl. No.: 926,007

[22] Filed: Aug. 4, 1992

Related U.S. Application Data

[63] Continuation-in-part of Ser. No. 585,712, Sep. 18, 1990, Pat. No. 5,136,600.

[51] Int. Cl.[5] .............................................. H01S 3/13
[52] U.S. Cl. ...................................... 372/32; 372/31; 372/34; 372/6; 372/69
[58] Field of Search ................... 372/32, 6, 69, 70, 31, 372/34; 385/15

[56] References Cited
U.S. PATENT DOCUMENTS
5,136,600  8/1992  Fidric et al. .......................... 372/32

Primary Examiner—Léon Scott, Jr.
Attorney, Agent, or Firm—James F. Kirk; M. Michael Carpenter

[57] ABSTRACT

A wavelength stabilization apparatus and method for a superfluorescent source comprising a SFS (superfluorescent source) comprising a fiber with a core doped with lazing material. The SFS source produces SFS light with an SFS wavelength when pumped with pump light from a pump light source having a pump light wavelength. An output controller responds to a sample of the SFS light and operates to maximize the power of the sample of SFS light by automatically adjusting the pump light wavelength. The output controller also has a pump power controller responsive to a sample of the pump light from the pump light source for stabilizing the output power of the sample of the pump light with respect to a predetermined reference output power level.

18 Claims, 15 Drawing Sheets

STABILIZATION APPARATUS AND METHOD FOR AN SFS

This is a continuation in part application of U.S. patent application Ser. No. 07/585,712 filed Sep. 15, 1990 for a STABILIZATION APPARATUS AND METHOD FOR AN SFS issuing on Aug. 4, 1992 with U.S. Pat. No. 5,136,600 and having common inventors and assignee

BACKGROUND

1. Field of the Invention

This invention relates to the field of optics and more particularly to the field of light sources, also called amplified spontaneous emission (ASE) laser useful in applications such as interferometric sensors such as a fiber optic gyro.

2. Related Art

U.S. Pat. No. 4,792,956 for a "Laser Diode Intensity And Wavelength Control" issued Dec. 20, 1988 to George W. Kamin, Albuquerque, N. Mex. and has a common assignee. This patent provides a topology for comparing the intensity and wavelength of an optical signal output from a laser diode to a desired value for the purpose of generating error signals. A temperature control device is used to control the temperature of a laser diode. An SFS source is not disclosed.

U.S. Pat. No. 4,637,025 for a "Super Radiant Light Source" issued Jan. 13, 1987 to E. Snitzer et al and described the use of a single mode optical fiber having a core doped with an active laser material such as neodymium. The fiber is pumped with pump light sufficient to produce amplification of spontaneous emissions. In one embodiment, a dichroic mirror is used to provide a double pass for light in the fiber core for extra gain. Snitzer does not show or suggest a control process for controlling the wavelength of the pump source light.

SUMMARY OF THE INVENTION

It is a first object of the invention to stabilize the output wavelength of a superfluorescent fiber source.

It is a second object of the invention to operate the superfluorescent source with maximum efficiency. The pump wavelength is automatically driven to a point to obtain the maximum efficiency of the super fluorescent source.

These objects and others are achieved in the invention wavelength stabilization apparatus and method for a superfluorescent source comprising a SFS (superfluorescent source) comprising a fiber with a core doped with lazing material. The SFS source produces SFS light with an SFS wavelength when pumped with pump light from a pump light source having a pump light wavelength. An output controller responds to a sample of the SFS light and operates to maximize the power of the sample of SFS light by automatically adjusting the pump light wavelength. The output controller also has a pump power controller responsive to a sample of the pump light from the pump light source for stabilizing the output power of the sample of the pump light with respect to a predetermined reference output power level.

PREFERRED EMBODIMENT

Figure 1:
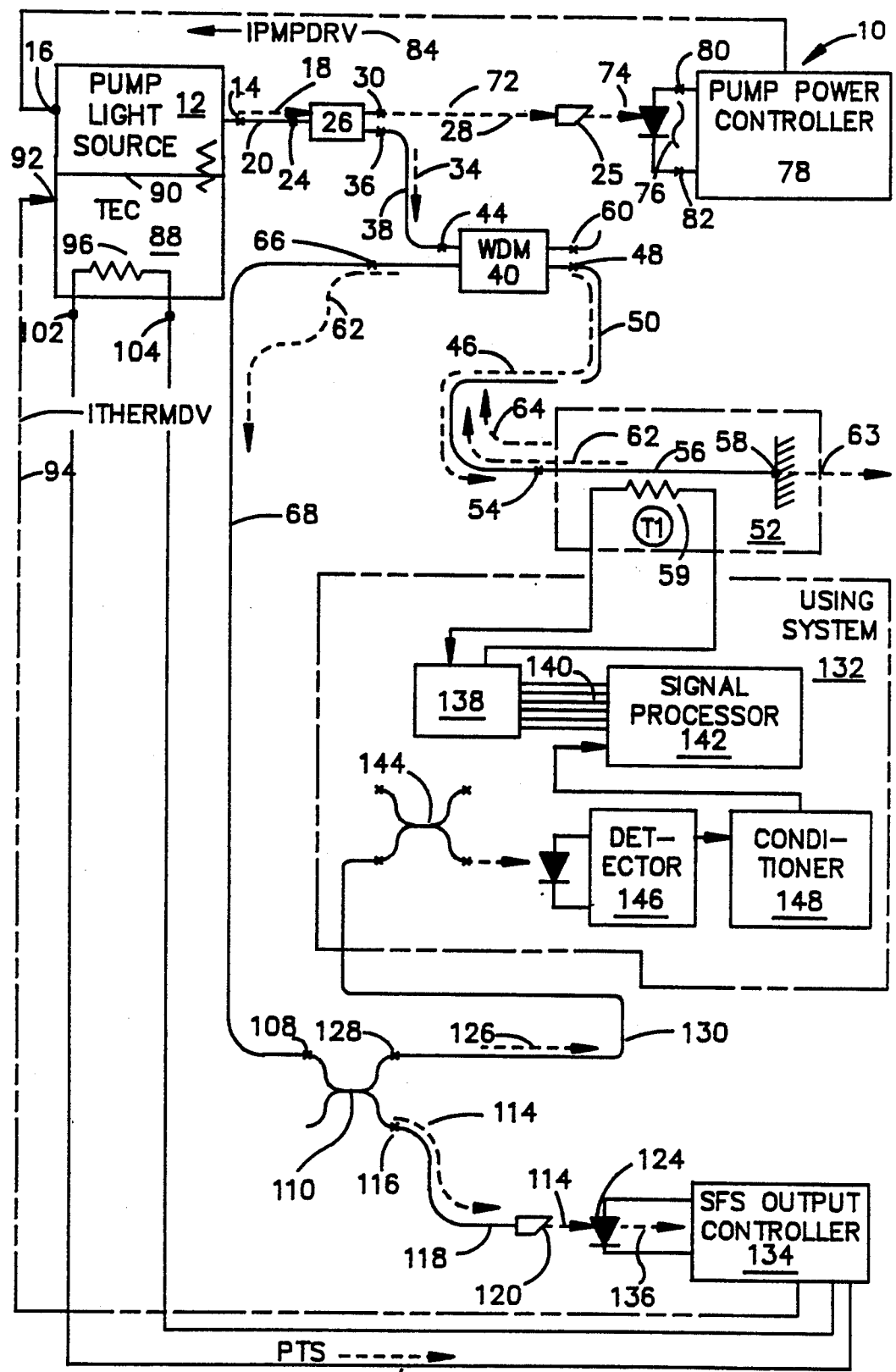
FIG. 1 is a block diagram of a preferred control system for stabilizing the wavelength of a broadband super fluorescent light source (SFS,) the pump light ray sample to the pump power controller being wavelength independent.

The topology of FIG. 1 shows a pump light source 12 having a pump output port 14 and a pump input terminal 16. The pump light source 12 provides a pump light ray 18 via pump optical path 20 to pump coupler input port 24 of pump coupler 26. The pump coupler 26 is typically a tapered biconical device characterized to split the narrow band light that it receives from the pump light ray 18 and to output a small portion, (typically 1%), of the pump light ray 18 as a pump monitor light ray 28 at a pump coupler sample output port 30. The pump coupler outputs the remainder of the light, (typically 99%) of the pump light ray 18 as the pump drive ray 34 at the pump coupler output port 36 to the coupler output optical path 38.

A wavelength dependent multiplexer (WDM) 40 has a pump optical input port 44 coupled to receive the pump drive ray 34 via the coupler output optical path 38. The WDM 40 couples a substantial portion of the pump drive ray 34 from the WDM pump optical input port 44 as the WDM pump main ray 46 from the WDM pump output port 48 at the frequency of the pump light source 12 via SFS pump fiber 50 to the super fluorescent source (SFS) 52 at the SFS input port 54.

The SFS 52 shown in the embodiment of FIG. 1 has a doped fiber such as an erbium doped fiber 56 of predetermined length with a first end coupled to receive the WDM pump main ray 46 at the SFS input port 54 and a second end terminated on a dichroic mirror 58.

The WDM 40 also has a spare output port 60 that is not used in the embodiment of FIG. 1. The end of the spare output port 60 is terminated in such a way that the back reflection is kept below a critical value, e.g., polished at an angle greater than the critical angle to minimize the reflection of light back into the WDM 40.

The dopant ions used in the doped fiber 56 are typically ions such as erbium ions. The erbium ions in the erbium doped fiber 56 respond to the WDM pump main ray 46 by fluorescing to produce SFS source light as an SFS emission ray 62 at an SFS source wavelength characterized by the energy states of the dopant ions.

The SFS source wavelength is displaced from the wavelength of that of the WDM pump main ray 46 which has its origin in light from pump light ray 18 and pump source 12. The pump source 12 is typically a laser diode providing narrow band light and operating at 980 nm or at 1475 nm. An erbium doped fiber can be pumped with light having a wavelength at either 980 nm or 1475 nm. The wavelength of the light produced by the fluorescence of the erbium ions as they are excited by the optical energy of pump main ray 46 in doped fiber 56 is typically broadband light centered at 1560 nm.

As an optional embodiment, the dichroic mirror 58 is designed to be transparent to light at the wavelength of the pump main ray 46. Allowing the optical power of the pump main ray 46 that is not used in pumping the dopant ions in the SFS source 52 to pass through the dichroic mirror 58 and to escape as pump residual ray 63 prevents a major portion of the pump main ray 46 from entering the using system after reflection from the dichroic mirror 58 and exiting the SFS 52 via SFS input port 54.

The dichroic mirror 58 is designed to be highly reflective at the wavelength of the SFS emission ray 62. Optical power having the broad band wavelength of the SFS emission ray 62 that is produced by the SFS 52 propagates in both directions in the erbium doped fiber 56. A portion of the broadband optical power that propagates to the right toward the dichroic mirror 58 is reflected by the dichroic mirror 58 back through the doped fiber 56, to the left, along with that portion of the broadband optical power that propagates directly to the left to the SFS input port 54. Only a very small amount of the reflected pump light 64, at the wavelength of pump main ray 46, is reflected by the dichroic mirror 58 and also propagates to the SFS input port 54 with the SFS emission ray 62. The broad band optical power produced by the erbium doped fiber 56 as SFS emission ray 62 and the small amount of reflected pump light 64 that is reflected off of the dichroic mirror 58 then passes back through fiber 50 into the WDM pump output port 48. The above described configuration is refered to as a double pass topology. In applications where feedback is a concern it may be appropriate to omit the mirror to form a single pass configuration.

The WDM 40 is designed and characterized to pass substantially all of the light at the wavelength of the broadband optical power, i.e. the SFS emission ray 62, produced by the erbium doped fiber 56, to the WDM fiber output port 66 and then to the WDM output fiber 68. The WDM 40 also passes a substantial portion of the reflected pump light 64 to pump optical input port 44 further reducing the amount of reflected pump light 64 that can reach the WDM fiber output port 66.

A pump monitor fiber 72 couple the pump monitor light ray 28 from the pump coupler sample output port 30 to a pump monitor detector 74. The pump monitor detector 74 produces a pump monitor signal 76 that is proportional to the output power of the pump monitor light ray 28. The pump monitor signal 76 is coupled to a pump power controller 78 at pump power controller terminals 80, 82. The pump power controller 78 responds to the pump monitor signal 76 to provide and to constantly adjust a pump power control signal 84, IPMPDRV, to the pump input terminal 16 of the pump light source 12 to hold the pump monitor light ray 18 at substantially constant optical power.

A peltier or thermo-electric cooler (TEC) 88 is coupled to the pump light source 12 via a thermally conductive path 90. The TEC 88 has an input control terminal 92 responsive to a pump temperature drive signal 94, ITHERMDV, for adjusting the temperature of the pump light source 12. A pump temperature sensor 96, such as a thermistor, provides a PTS (pump temperature signal) 98 at first and second pump temperature sense terminals 102, 104 that characterizes the temperature of the pump light source 12.

The WDM output fiber 68 couples SFS emission ray 62 from the WDM fiber output port 66 to an input port 108 of an output coupler 110. The output coupler 110, is similar to the pump coupler 26 in that it is typically a broadband tapered bi-conical device characterized to split the SFS emission ray 62 that it receives at input port 108 from the WDM output fiber 68 and to output a small portion, (typically 1%), of the SFS emission ray 62 as an SFS power monitor light ray 114 at an output coupler sense output port 116 via output detector fiber 118 to detector output port 120. SFS output detector 124 receives SFS power monitor light ray 114 from detector output port 120. The output coupler 110 outputs the remainder of the SFS emission ray 68 (the remaining 99%) as the SFS output ray 126 at the output coupler output port 128 via SFS output fiber 130 to the using system 132.

The pump coupler 26 is fabricated or purchased to have a substantially broad band or near flat power transfer or gain characteristic over a relatively broad frequency spectrum centered at or near the center frequency of the pump light ray 18. The pump coupler 26 is typically constructed to split the optical power received at the pump coupler input port 24 with a fixed ratio that is substantially insensitive to frequency and importantly temperature in comparison to the configuration of FIG. 3 that relies on pump monitor light ray 28a directly from WDM coupler port 60.

Figure 2A:
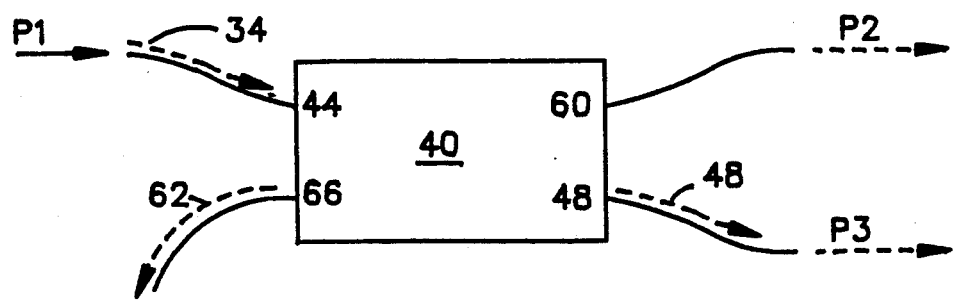
FIGS. 2a, 2b are schematic block diagrams showing the input and output ports of a wavelength dependant multiplexer preparatory to test.
Figure 2B:
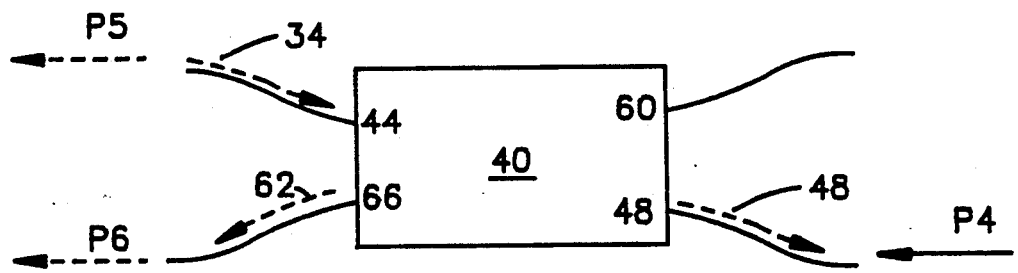
Figure 2C:
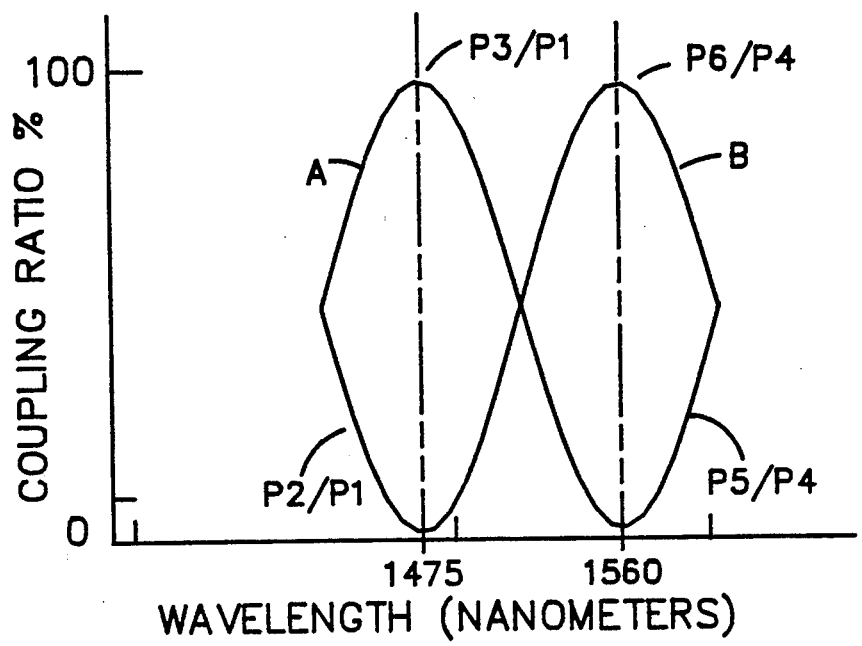
FIG. 2c is a schematic graphical representation of the output to input optical power relationships that would possibly exist for the test of a wavelength dependent multiplexer as characterized in the test depicted in FIGS. 2a and 2b.
Figure 3:
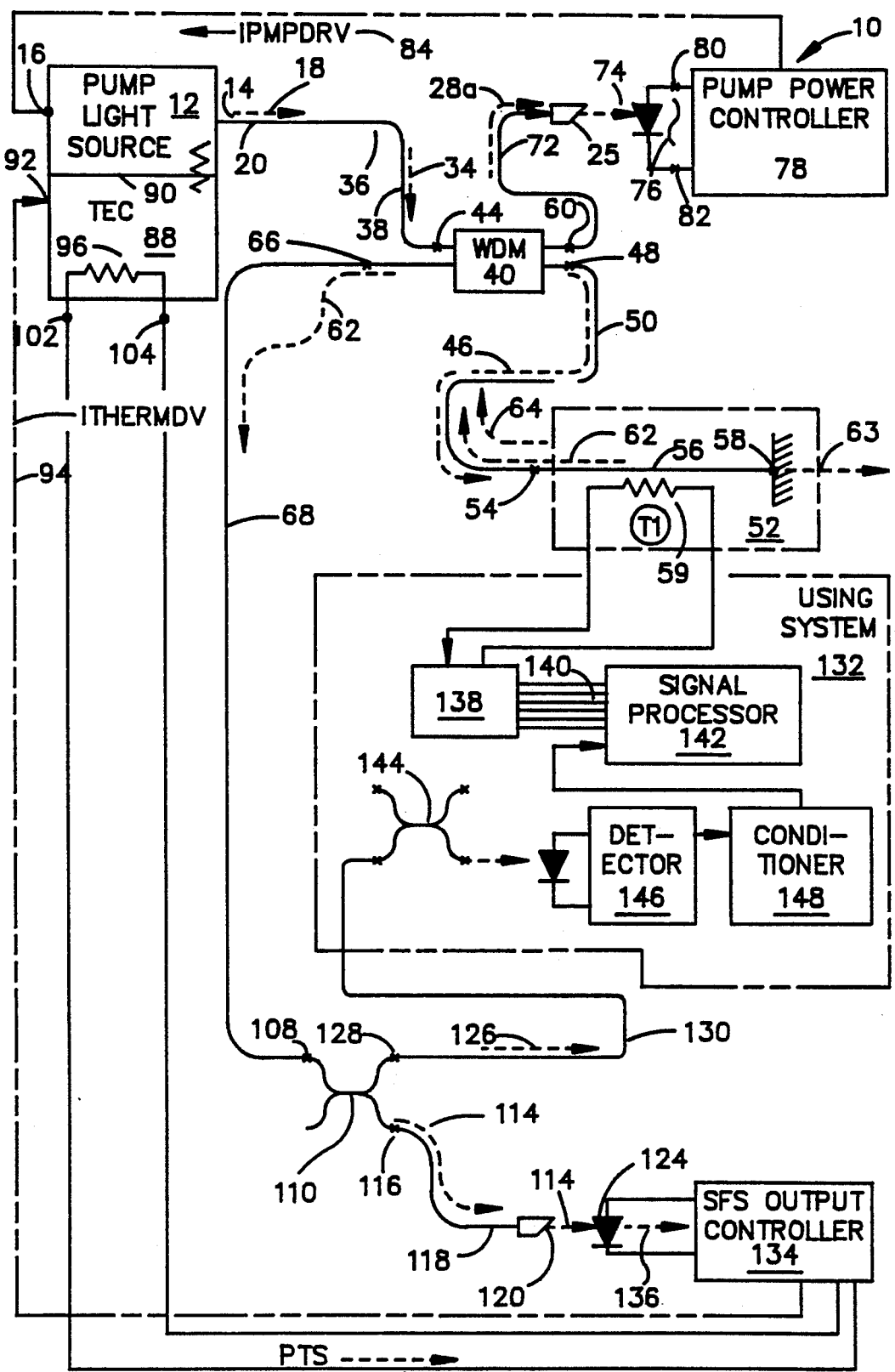
FIG. 3 is an alternative embodiment of a block diagram of a less stable control system for stabilizing the wavelength of a broadband super fluorescent light source (SFS), the pump light ray sample to the pump power controller being wavelength dependent.

In the embodiment of FIG. 3, and in accordance with FIG. 2c, it can be seen that a small change in the wavelength of pump beam 34 caused by the temperature influencing the pump light source 12 will result in a large change of the P2/P3 ratio which the pump power controller will attempt to compensate for in error. The induced change is sufficiently high to degrade the emission wavelength stability of the system.

The preferred embodiment is therefore the more complex topology of the embodiment of FIG. 1 using broadband coupler 26 with a pump wavelength very close to the wavelength of the doped fiber.

However; if the pump light source 12 has a center wavelength that is distant from the center emission line of the doped fiber, i.e., a 980 nm pump with an erbium doped SFS having a center emission wavelength at or near 1560 nm, then the wavelength separation is sufficient with respect to the lines in FIG. 2c to flatten out the P2/P3 ratio. A small change in pump wavelength due to effects such as temperature would thereby result in a much smaller change of the P2/P3 ratio which the pump power controller would compensate for without potential loss of control. The reduced sensitivity of the P2/P3 ratio would make it possible to use the topology of FIG. 3 with its reduced complexity as an alternative preferred embodiment.

Those skilled in the art, know that some laser diodes, are available from commercial suppliers with an internal back facet photodiode for providing an electrical monitor signal that represents a broadband samle of output intensity or power, in addition to a normal optical output port. Directly connecting the electrical leads of such an internal monitor photodiode to the pump power controller terminals 80 and 82 would appear to be functionally equivalent to that achieved by use of broadband coupler where the pump light source laser diode that is used does not have a monitor diode.

However; the use of an internal monitor photodiode will not detect variations in optical pump power due to or related to changes in the coupling efficiency between the laser diode and the pigtail fiber connecting the laser diode within the pump light source to optical port 14. For this reason, for high accuracy applications, the topology of FIG. 1 remains the preferred embodiment.

The pump coupler 26 and outputs the pump monitor light ray 28 at the pump sample output port 30 that is approximately a few percent of the optical power received at the pump coupler input port 24 while outputing substantially the remainder of the optical power received, at the pump coupler output port 36 via the coupler output optical path 38.

The wavelength dependent multiplexer (WDM) 20 is typically fabricated or purchased from an optical component supplier such as Gould at Glenburnie Ill., or Amphenol at Lisle, Ill. to have a relatively sharp or narrow band power transfer or gain characteristic. FIG. 2a and FIG. 2b schematically depicts the how the WDM is tested as a component out of the circuit of FIG. 1.

In the arrangement of FIG. 2a, a stable optical source (not shown) capable of providing a constant level of optical power at power levels P1, over the frequency range of interest, is applied to the pump optical input port 44. As the frequency of the source is swept in frequency, the output power levels are measured at WDM pump output port 48 (P3) and spare output port 60 (P2). The power meter measurements are made as the wavelength is varied from below 1475 nano meters past the center frequency of 1560 nano meters. Ratios of P3/P1 and P2/P1 are calculated as a function of frequency. The values of the calculated ratios are plotted as dependent variables of frequency as curve A in FIG. 2c.

In the arrangement of FIG. 2b, a stable optical source capable of providing a constant level of optical power at power levels P4, over the frequency range of interest, is applied to the WDM pump output port 48. As the frequency of the source swept in frequency, the output power levels are measured at the optical input port 44 (P5) and the WDM fiber output port 66 (P6). Ratios of P5/P4 and P6/P4 are measured as a function of frequency and the results of the two variables are plotted as the dependent function of frequency as curve B in FIG. 2c.

FIG. 3 is a schematic block diagram depicting an alternative embodiment of a control system, for stabilizing the wavelength of a broadband super fluorescent light source (SFS). The control system of preferred embodiment of FIG. 1 is more stable than the embodiment of the control system of FIG. 3 because the optical power level of the pump light ray sample 28a to the pump power controller 78 is wavelength dependent.

Pump light source 12 provides a pump light ray 18 at pump wavelength PMPLNTH and with pump power PMPPWR to the SFS (super fluorescent source) fiber 52 via pump optical path 20 to WDM (wavelength division multiplexer) 40.

"The WDM 40 splits the pump light ray 18 by a predetermined ratio and couples a first portion of the pump light ray 18, referred to as pump monitor light ray 28a with pump power Pp1, via a pump monitor fiber 72, to a pump monitor detector 74. Pump power controller 78 represents a pump power control means responsive to a pump detector signal 76 between terminals 80 and 82, from pump monitor detector 74 for adjusting the amplitudes of the pump drive current IPMDRV to maintain the pump monitor light ray 28a to the pump monitor detector 74 at constant power. A second portion of pump light ray 18, referred to as the WPM pump main ray 46 with pump power Pp2 is coupled into the SFS fiber source 52 via optical path 50.

The SFS fiber source 52 contains a single mode optical fiber 56 having a core doped with at least one active laser material such as neodymium or erbium. The SFS fiber is pumped by the WDM pump main ray 46 via SFS pump fiber 50 with sufficient power Pp2 to produce amplification of spontaneous emission of the active laser material, to provide an SFS emission ray 62 and reflected pump light ray 64 that exit the SFS input port 54 to return via SFS pump fiber 50 to WDM output port 48.

A dichroic mirror 58 is formed on the end surface of the erbium doped fiber 56 to reflect light at the wavelength of the SFS emission ray 62 to provide a double pass for SFS light in the SFS fiber source for extra gain. The dichroic mirror 58 is designed to pass a residual pump light ray 36 through the dichroic mirror 58 to avoid reflection of the unabsorbed portion of the pump main ray 46 back to the WDM 20. Use of the dichroic mirror 58 improves operation of the invention; however, the system will operate without it but with reduced efficiency.

The SFS emission ray 62 returns to the WDM 40 via SFS pump fiber 50 with an SFS emission power Ps and with the SFS emission wavelength Ls. The WDM 40 directs the SFS emission ray 62 via the WDM output fiber 68 as SFS emission ray 62 to the coupler input 108 of coupler 110.

Coupler 110 splits the SFS emission ray 62 into an SFS output ray 126 at SFS system output 128 and into an SFS power monitor light ray 114 output at output coupler sense output port 116 via output detector fiber 118 to detector output port 120. The output coupler 110 is typically designed to provide over 90% of the power of the SFS emission ray 62 to the SFS system output at output port 128 and less than 10% of the power to the detector output port 120. The SFS power monitor light ray 114 is directed via output detector fiber 118 through the detector output port 120 to SFS output detector 124. The SFS output ray 126 is directed via SFS output fiber 130 to a Using System, such as one or more fiber optic gyros or other interferometric sensors such as hydrophones, represented by the elements within phantom block 132.

It should be understood, by those skilled in the art, that an optical fiber is a form of an optical waveguide and in some applications, optical waveguides might be substituted for one or more of the optical paths shown in FIGS. 1 or 3 as a matter of design choice for performance, cost or size reasons.

SFS output controller 134 represents a temperature control means responsive to an SFS output sense signal represented by phantom line 136 from SFS output detector 124 for adjusting the wavelength of the pump light ray 18 by adjusting the pump temperature Tp of the pump light source 12 to maximize the amplitude of the SFS sense ray 114 by adjusting the drive current ITHERMDV to a thermal electric cooler (TEC) 88.

Pump power controller 78 represents a pump power control means responsive to a pump detector signal from pump monitor detector 74 for adjusting the amplitude of the pump drive current IPMDRV to maintain the pump monitor light ray 28 from pump monitor fiber port 25 at constant power.

OPERATION

Figure 4:
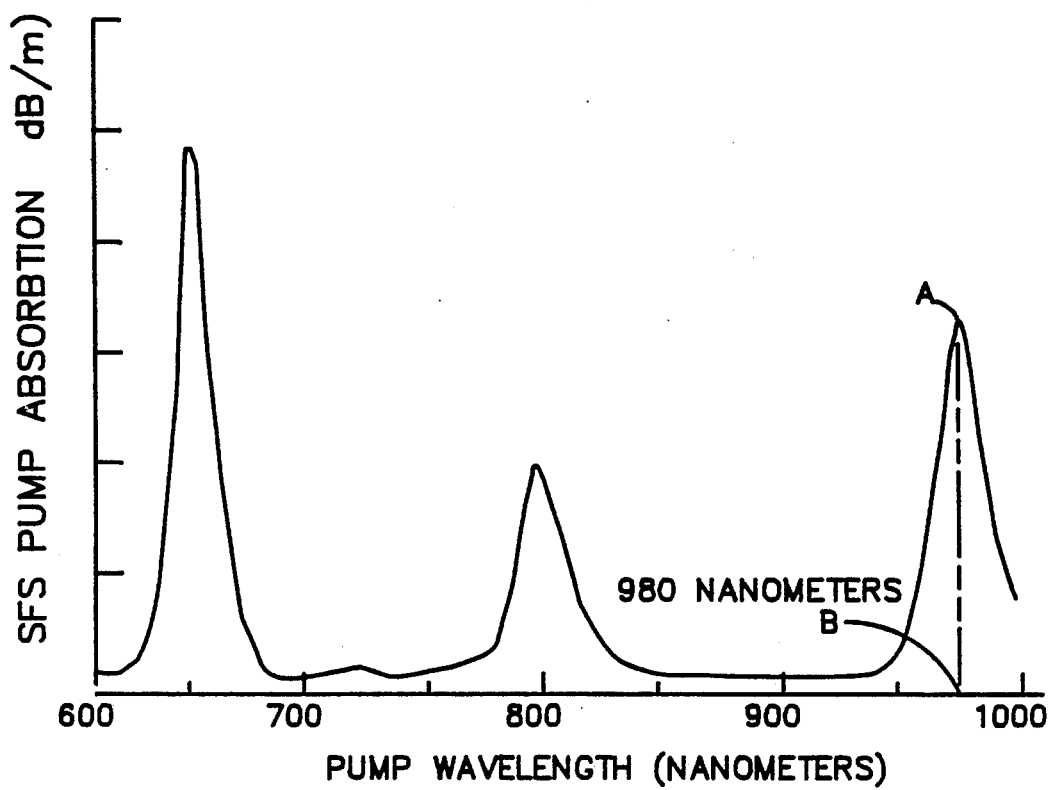
FIG. 4 is a graphical schematic representation of the pump absorption by the SFS fiber measured as the ratio of the residue pump power leaving the super fluorescent source fiber to the power into the SFS fiber as a function of the pump wavelength.

FIG. 4 is a graphical schematic representation of the SFS pump absorption by the SFS fiber measured as the inverse ratio of the residual pump power in sense ray 57 leaving the super fluorescent source fiber via dichroic mirror 58 to the power delivered to the SFS fiber 56 by WDM pump main ray 46 via the SFS pump fiber 50 as a function of the pump wavelength PMPLNTH of the pump light ray 18. The peak in the absorption of pump power at "A" was obtained using a sample of Erbium doped alumina-silicate fiber. The peak at "A" was observed to occur at approximately 980 nano meters as the pump wavelength PMPLNTH is swept from 900 nano meters to 1000 nano meters while holding the power in the pump monitor light ray 28 shown in FIGS. 1 and 3 substantially constant.

A laser diode with a center wavelength at 980 nano meters was selected for use in the pump light source 12; however, in alternate embodiments, laser diodes with wavelengths centered at 810, 980 or 1475 nanometers can be used depending on the requirements of the particular embodiment. A model OL452A diode purchased from OKI in Japan was suitable for the application.

Figure 5:
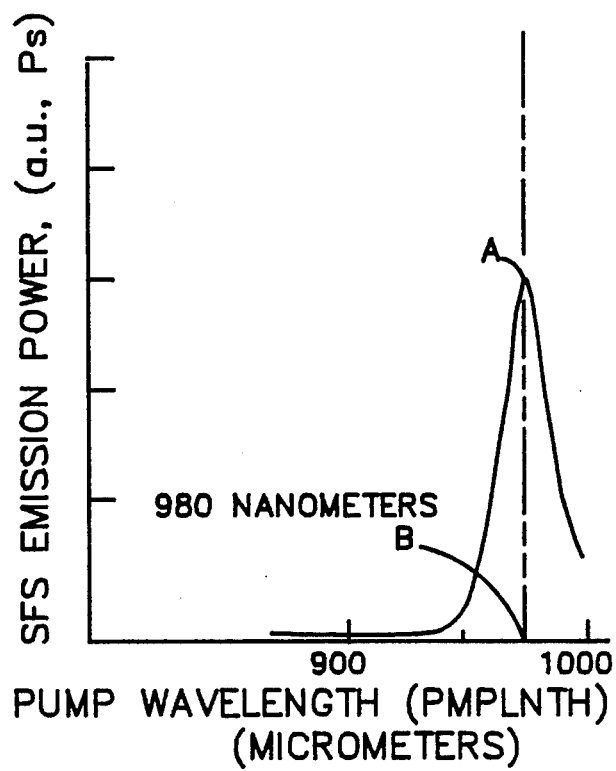
FIG. 5 is a graphical schematic representation of the SFS fiber emission power as a function of pump wavelength with pump power being held constant.

FIG. 5 is a graphical schematic representation of the SFS emission power in SFS emission ray 62 as a function of pump wavelength with pump power being held constant. This graph shows that the peak output power of the SFS emission ray 62 to WDM 40 also coincides with a pump wavelength of 980 nanometers at "B" on the PUMP WAVELENGTH axis.

Figure 6:
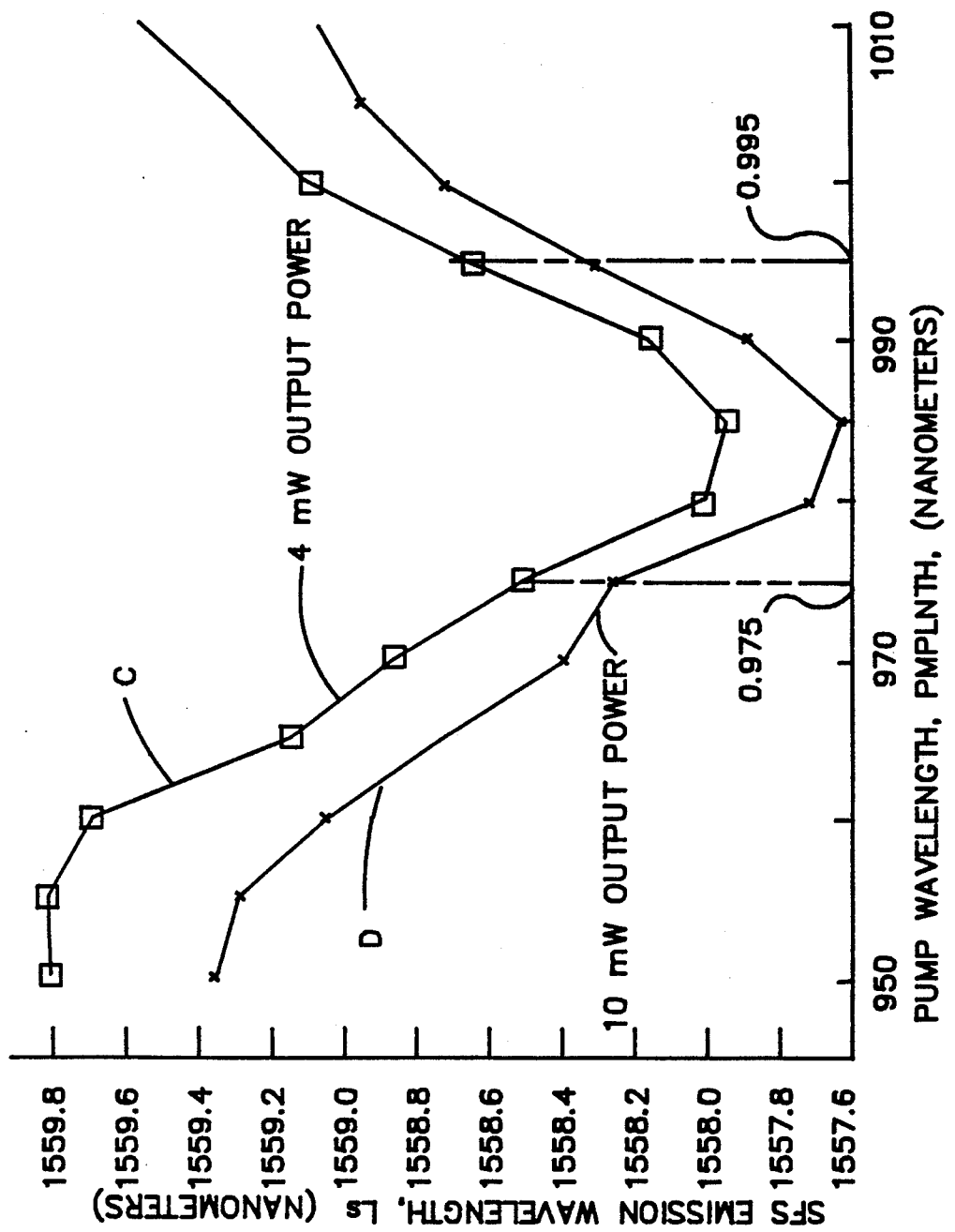
FIG. 6 is a graphical schematic representation of the SFS fiber emission wavelength as a function of pump wavelength with pump power held constant at a first and second level.

FIG. 6 is a graphical schematic representation of data that shows that the SFS fiber emission wavelength Ls of the SFS emission ray 62 varies as a function of the pump light ray 18 pump wavelength PMPLNTH. Variation of the SFS fiber emission wavelength Ls as a function of pump wavelength is shown with the SFS emission power held constant at a first level of 4 mW and second level of 10 Mw.

FIG. 6 shows that the stability of the SFS wavelength is greatest where the change in SFS wavelength with respect to a change in the pump wavelength is least. The point of greatest stability also occurs when the pump wavelength PMPLNTH is at or near 980 nano meters.

Figure 7:
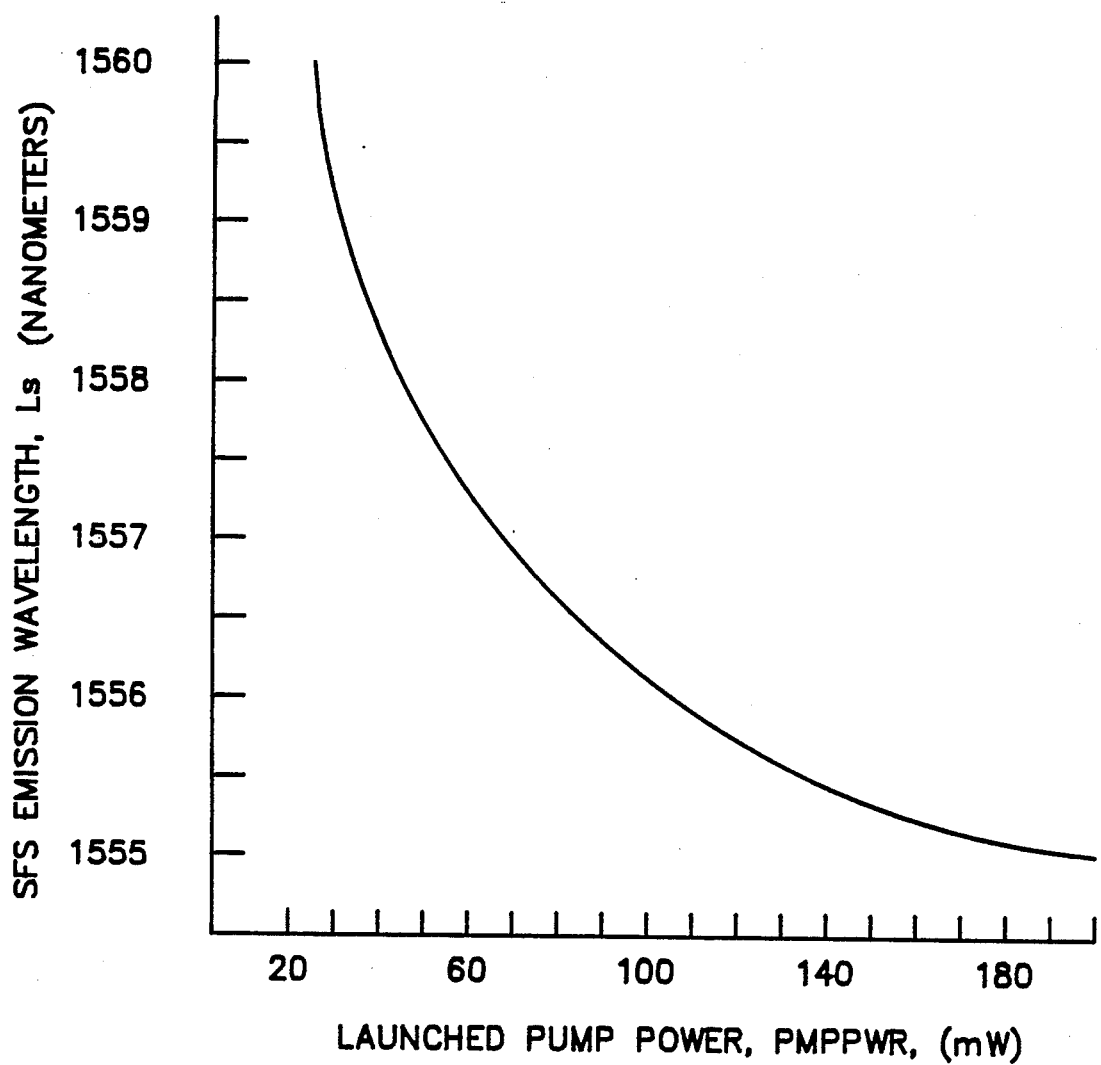
FIG. 7 is a graphical schematic representation that shows that the SFS fiber emission wavelength Ls of the SFS emission ray 32 varies as a function of the pump light ray 16 pump light power PMPPWR.

FIG. 7 is a graphical schematic representation of data that shows that the SFS emission wavelength Ls of the SFS emission ray 62 varies as a function of the pump light power PMPPWR of the pump light ray 18. By way of example, the power level of this ray is typically in the order of 30 Mw. A pump power stability of about 1% is required to achieve an SFS emission wavelength stability of approximately 30 ppm.

Figure 8:
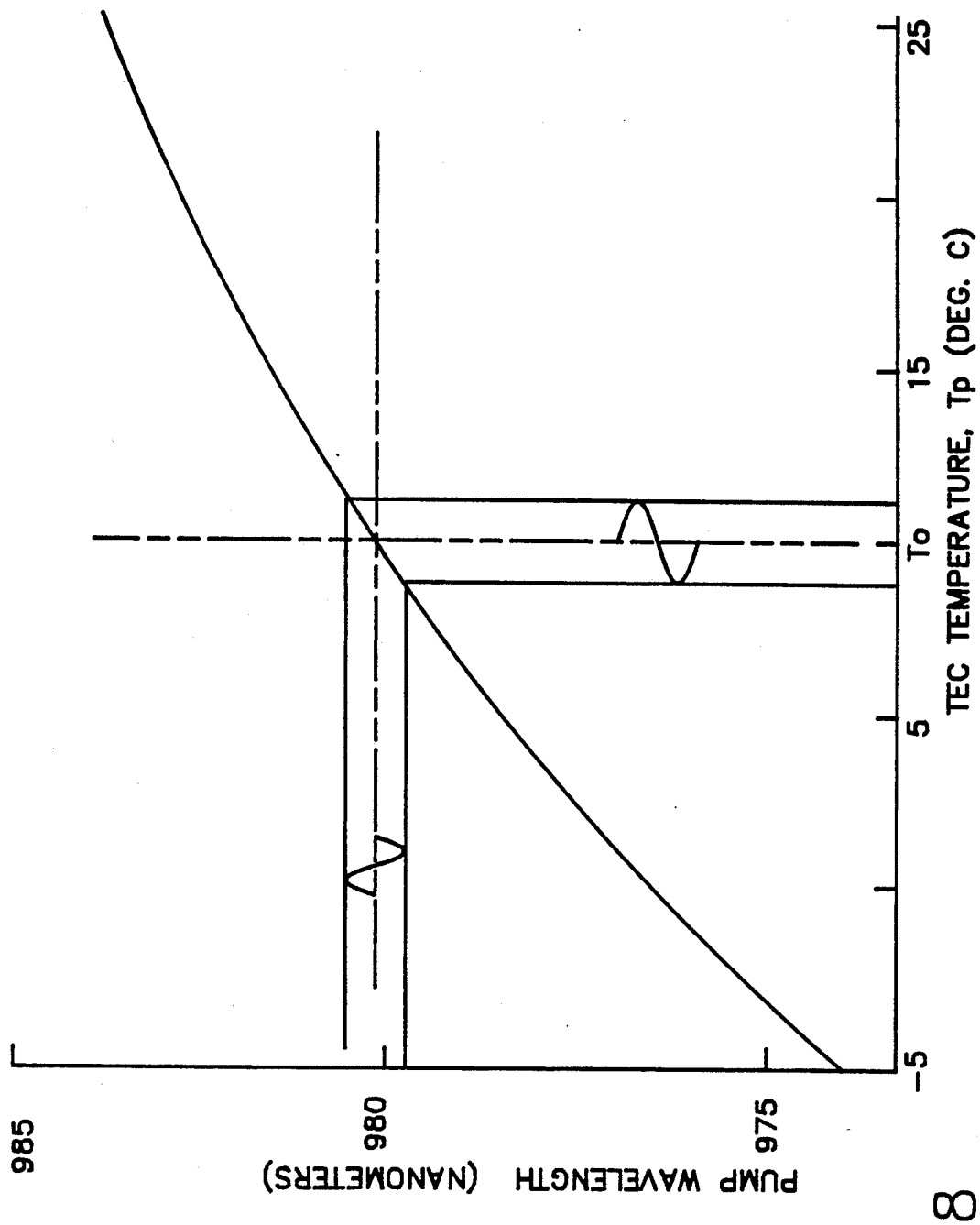
FIG. 8 is a graphical schematic representation of the pump wavelength as a function of temperature.

FIG. 8 is a graphical schematic representation that shows that the pump wavelength PMPLNTH varies as a function of pump temperature. The wavelength PMPLNTH of the pump light ray 18 is controlled by a means for controlling the pump source temperature such as the thermoelectric cooler (TEC) 88. FIG. 8 also shows that as the TEC 88 temperature is modulated over a controlled range, the pump wavelength varies accordingly.

Figure 9:
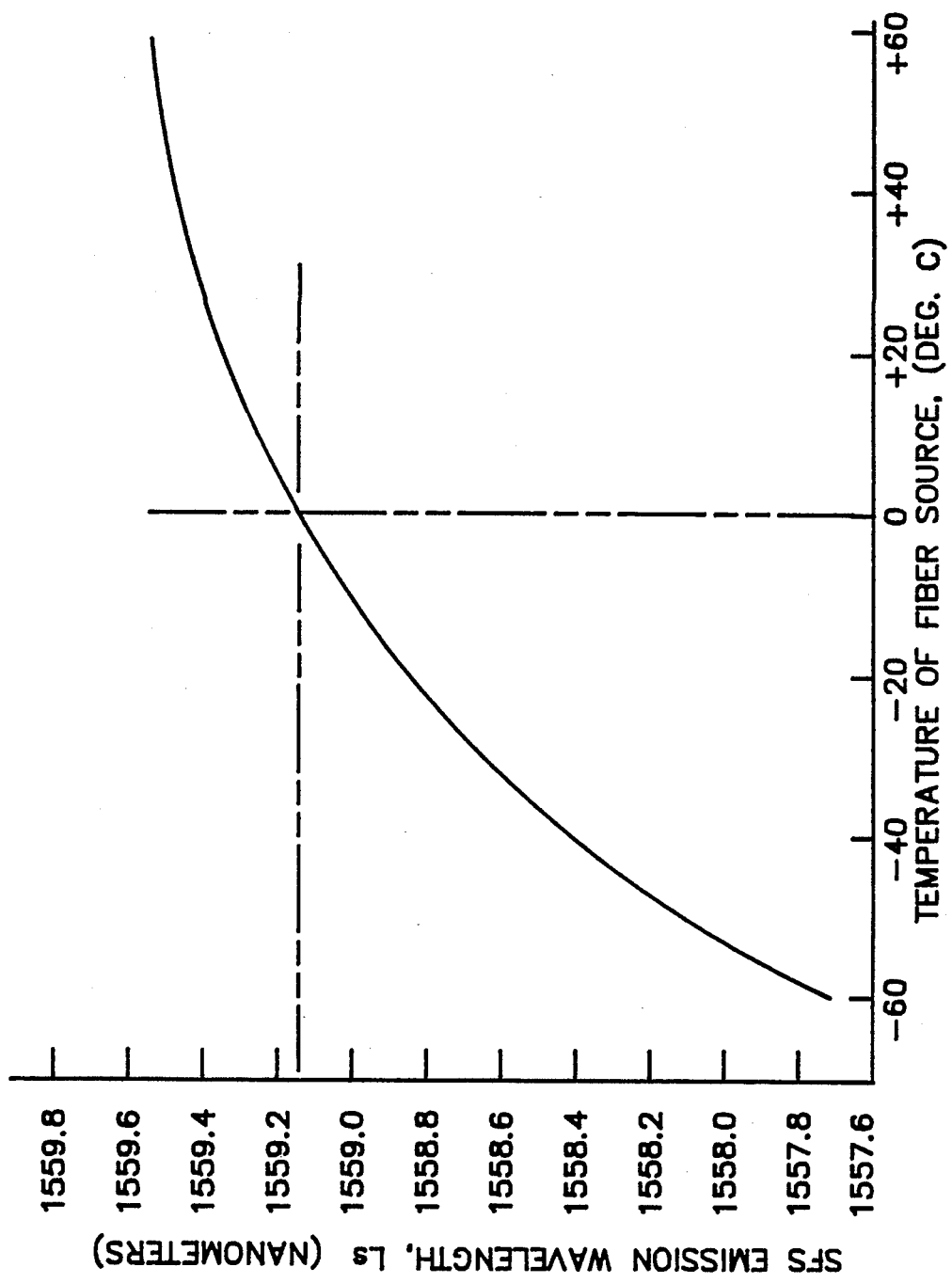
FIG. 9 is a graphical schematic representation of the SFS emission wavelength Ls as a function of the temperature of the SFS fiber source.

FIG. 9 graphical depicts in schematic fashion that the SFS emission wavelength Ls varies also as a function of the temperature of the SFS fiber source. Since the pump light source 12 is typically a diode with a dissipation that is dependent on its forward voltage drop and the drive current passing through it, and since there is no mechanism or process present to link the temperature of the SFS fiber source 52 to that of the pump light source 12, contributions to a change in the wavelength of the SFS source 52 due to changes to the temperature of the pump light source 12 which changes PMPLNTH and changes to the SFS source wavelength Ls from changes in the temperature of the SFS fiber source 52 are substantially independent of each other.

Equation 1, below, shows that the variation of the SFS emission ray wavelength Dls is a function of the partial derivative of Ls with respect to pump power PMPPWR times an incremental change in pump power DPMPPWR, plus the partial derivative of Ls with respect to pump wavelength PMPLNTH times an incremental change in pump wavelength DPMPLNTH, plus the partial derivative of Ls with respect to the temperature of the SFS source fiber Ts times and incremental change in the temperature of the source fiber Dts.

A net decrease in the maximum absolute value of Dls term at the left of the equation implies an increase in the stability of the SFS emission ray wavelength Ls. It is clear that the stability of the SFS emission ray wavelength Ls is greatest when the term Dls goes to zero.

The Dls term is zero when the three terms on the right side of Equation 1 sum to zero.

$$Dls = (Dls/DPMPPWR)*DPMPPWR + (Dls/DPMPLNTH)*DPMPLNTH + (Dls/Dts)*Dts \quad (1)$$

Figure 10:
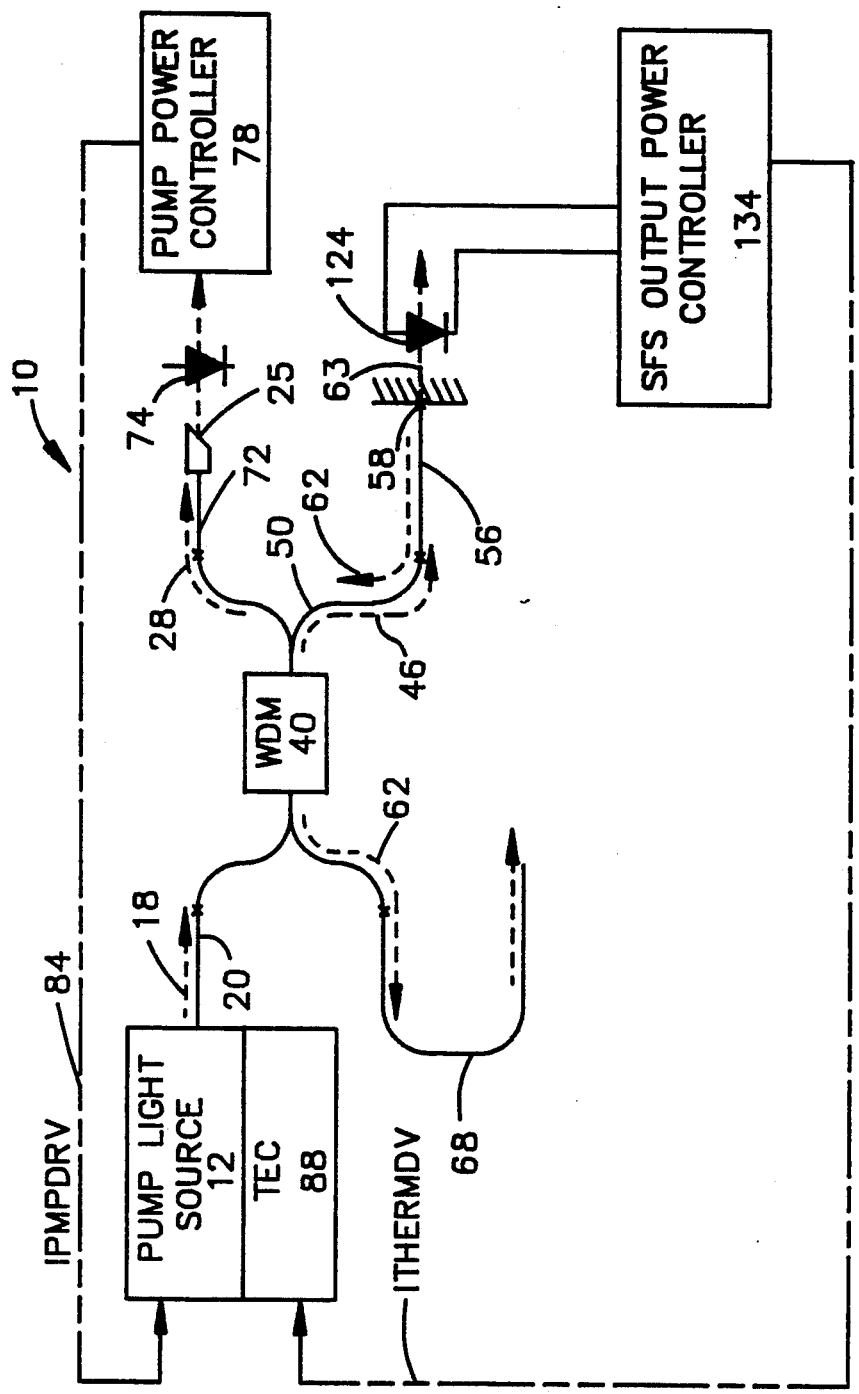
FIG. 10 is a block diagram of an alternate embodiment of the control system for stabilizing the wavelength of a broadband super fluorescent light source (SFS)

FIG. 10 shows a mechanization of an alternative preferred embodiment in which the third term in Equation 1 relating to the temperature of the SFS fiber source 12 is modeled out using the measured temperature of the system and the variation in wavelength depicted as a function of temperature for an erbium doped fiber in FIG. 7. FIGS. 1 and 3 show preferred embodiments in which the third term of Equation 1 is evaluated by thermistor 59, signal conditioner 138 and modeled out by the processes of signal processor 142 based on a table of information characterizing the dependent relationship of the SFS wavelength with the SFS temperature as related by FIG. 7. Referring to FIGS. 1 and 3, SFS thermistor T1 59 senses the temperature of the SFS fiber source and provides an SFS temperature signal to a signal conditioner 138 within a using system within phantom block 132.

Signal conditioner 138 converts the SFS temperature signal into a series of sampled digital values that are coupled via bus 140 to signal processor 142 for use in correcting factors sensitive to the wavelength of the SFS output signal via SFS output ray 126 from SFS output coupler output port 128 of coupler 110.

Using system 132, is typically an instrument such as an interferometer, fiber optic gyro, or triax fiber optic gyro that receives and uses the stabilized SFS output light ray 126 at a receiving coupler 144 or other internal optics arrangement or instrument. The receiving coupler is used to output at least a first portion of the SFS output signal 126 to at least a first internal instrument or system detector 146.

The output of each system detector 146 couples the signal to a conditioner such as conditioner 148. After amplification and conditioning by conditioner 148, the conditioned signal from conditioner 148 is also provided to the signal processor 142 where the compensating effects from the SFS temperature signal are used to compensate for variation in the system signal from conditioner 148 that are due to the influence of temperature effects on the SFS source.

Referring to FIGS. 1 and 3, as the temperature of the SFS source 52 varies, the signal processor 142 refers to a relationship, such as the relationship of FIG. 9, and the measured value of the temperature of the SFS fiber source 52 for a particular fiber and calculates the compensation required to cancel the effect of the third term in Equation 1.

Figure 16:
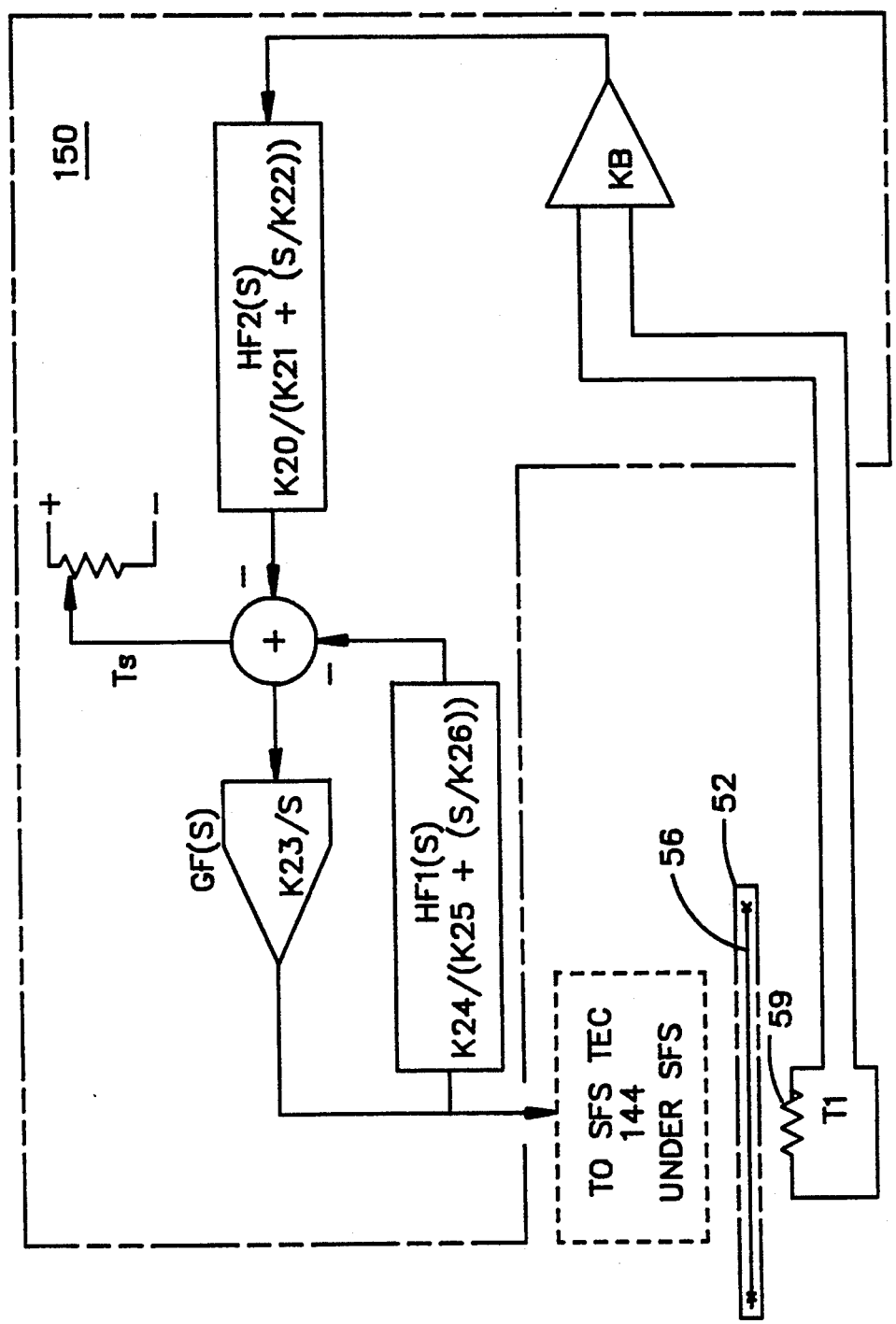
FIG. 16 is a block diagram of an embodiment of a temperature controller for the SFS fiber source.

In another alternate embodiment of the invention, such as that shown in FIG. 16, the SFS fiber source 52, containing doped fiber 56, is placed on a temperature controller such as SFS TEC 144. The SFS thermistor 59 senses the temperature and provides the SFS temperature signal to an SFS fiber temperature control process represented by phantom block 150 for controlling the temperature of the SFS fiber source 52.

In the alternative embodiment of FIG. 16, the TEC 144 in combination with the control process elements within phantom block 146 represent an SFS fiber temperature control means responds to the SFS temperature signal from thermistor 59 and to a predetermined temperature reference signal $T_s$ for stabilizing the temperature of the SFS fiber 56 to a value corresponding to the predetermined temperature reference signal $T_s$.

It is apparent from the block diagrams of FIG. 1 and 3 that by sensing the temperature of the SFS fiber source 52, and by using temperature control process 150 for the SFS fiber source 52 such as that described above in connection with FIG. 16, it would be feasible to further stabilize the superfluorescent source by turning the third term in Equation 1 substantially to a constant bias term.

In each of the above alternative embodiments, the associated wavelength error in the SFS system output signal 126 is optionally compensated by the subsequent using system 132 by software corrections made by the system signal processor 142.

The control process of Equation 1 that remains requires that the value of the first and second terms be as small as possible, or of equal magnitude and opposite sign. In the embodiment of FIGS. 1 and 3, the pump monitor detector 74 provides a signal representative of the amplitude of the first portion of the pump power Pp1 to the pump power controller 78. The pump power controller 78 represents a means responsive to the pump power monitor signal from pump monitor detector 74 for regulating the value of IPMPDRV to fix the output power of the light from the pump light source 12 to a predetermined value. Thus, the first term in Equation 1 above is close to zero since (DPMPPWR≠0) by operation of the controller.

Figure 15:
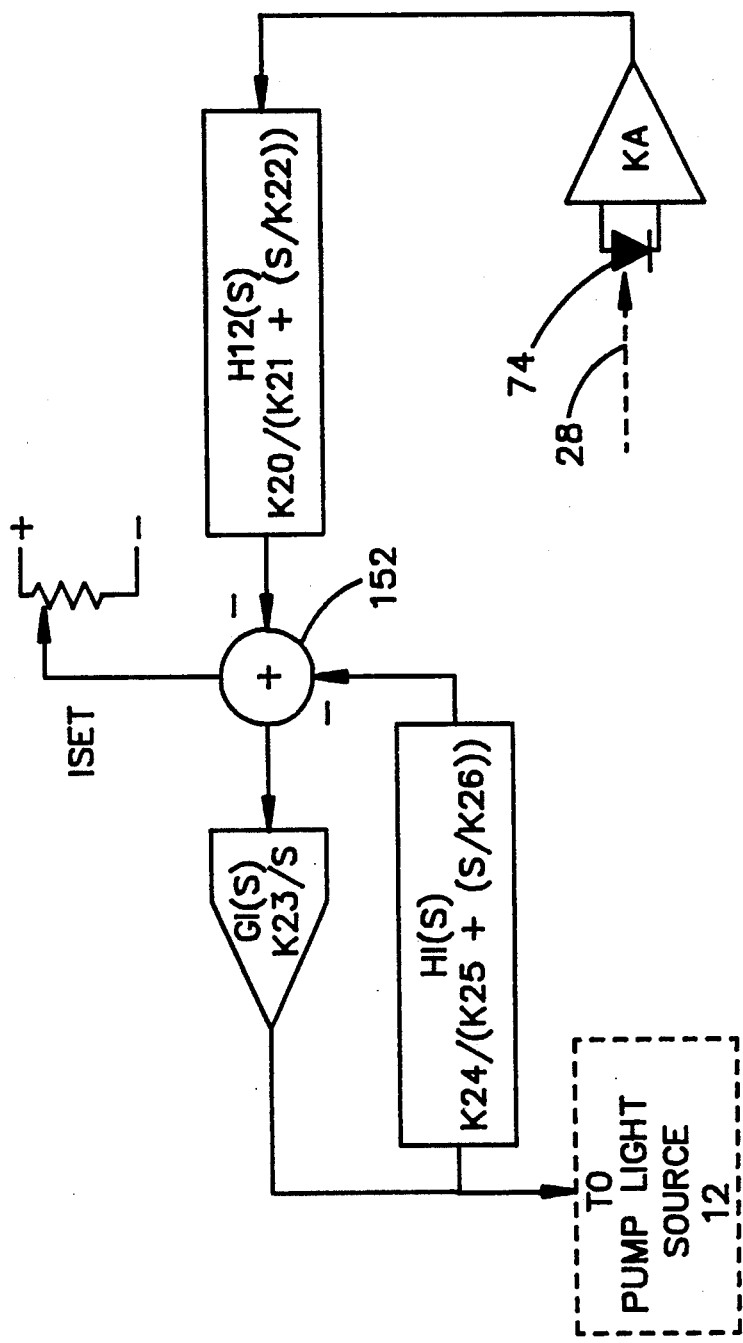
FIG. 15 is a block diagram of an embodiment of the pump power controller for the control system for stabilizing the wavelength of a broadband super fluorescent light source (SFS)

FIG. 15 shows an embodiment of the pump power controller 78 in which detector 74 senses light ray 28 which is proportional to the output power of the pump light source light applied to the SFS source 52. The signal from detector 74 is amplified and conditioned by amplifier KA. The output of the amplifier KA is low pass filtered by filter HI2(S). The filtered output is fed to the adder 152 and summed with predetermined signal ISET representing the desired current in the pump power source. The output of the adder is integrated by GI(S) and the integrated output is fed back via HI1(S) to the adder 152. The output of the integrator is used to drive current to the pump light source 12.

FIG. 16 shows an embodiment of the SFS fiber temperature controller in which thermistor T1 senses the temperature of the SFS fiber 56 within SFS source 52. The SFS temperature signal from the thermistor T1 59 is conditioned by amplifier KB and is proportional to the temperature of the SFS fiber source 52. The SFS temperature signal is low pass filtered by filter HF2(S). The filtered output is fed to the adder 154 and summed with predetermined signal Ts representing the desired temperature of the SFS fiber source 52. The output of the adder 154 is integrated by GF(S) and the integrated output is fed back via HF1(S) to the adder 154. The output of the integrator is used to drive the TEC 144 to control the temperature of the SFS fiber source 52.

With reference again to FIG. 1 and 3, the invention is best characterized as a wavelength stabilization apparatus for a superfluorescent source 10. A SFS fiber source 52 represents an SFS (superfluorescent source) means for producing SFS light having an SFS wavelength when pumped with pump light from a pump light source 12 having a pump light wavelength, typically in range of 978 to 983 nano meters. In the apparatus of FIG. 3, the invention has an output controller means represented by output controller block 134 that is responsive to a sample of the SFS light at ray 114 for maximizing the power of said sample of SFS light by automatically adjusting said pump light wavelength. By maximizing the power of ray 114, the output controller means maximizes the stability of the SFS fiber source output.

The performance of the stabilization apparatus for the invention superfluorescent source improves by adding a pump power controller means represented by block 78 to the output controller means to sample the pump light from said pump light source via ray 28 exiting fiber pump monitor fiber port 25 for stabilizing the output power of the sample of said pump light with respect to a predetermined reference output power level.

In each of the preferred embodiments, of the wavelength stabilization apparatus for the superfluorescent source, the SFS fiber source 52 contains a single mode optical fiber 56 having a core doped with at least one active laser material selected from the group of rare earth materials such as neodymium or erbium or aluminum.

Referring again to the embodiment of FIGS. 1 and 3 and FIG. 10 the SFS output controller 134 can be viewed as representing an output controller means having a pump light source 12 temperature control means such as the TEC (thermal electric cooler) block 88 that is responsive to a thermal drive signal such as ITHERMDV 94 for controlling the temperature of the pump light source 12, and an output sense and control means represented by block 134 for sensing the power of the sample of said SFS light via SFS sense ray 114, or as in FIG. 10, residual ray 62, and for dithering the thermal drive signal by superimposing a small oscillatory signal on ITHERMDV 94 to slightly vary the temperature of the pump light source around an operating temperature. A variation in pump light source temperature results in a corresponding variation in pump light source wavelength in pump light ray 18.

Figure 11A:
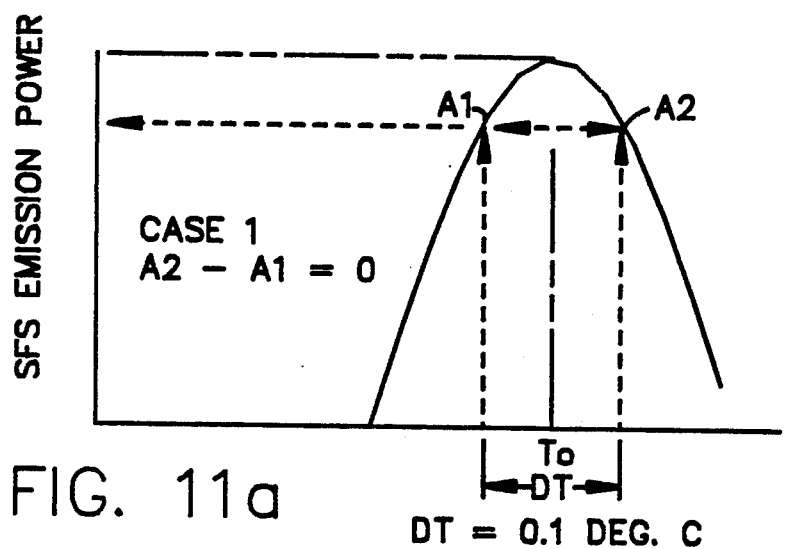
FIGS. 11a, 11b and 11c are graphical schematic representations showing the values of SFS fiber emission power that result at the extremes of a fixed variation in the temperature of the pump in response to variations in the TEC temperature DT.
Figure 11B:
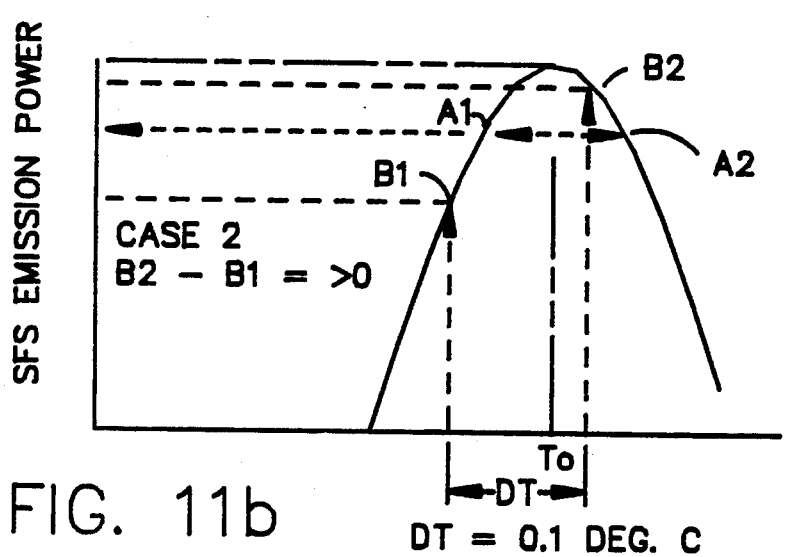
Figure 11C:
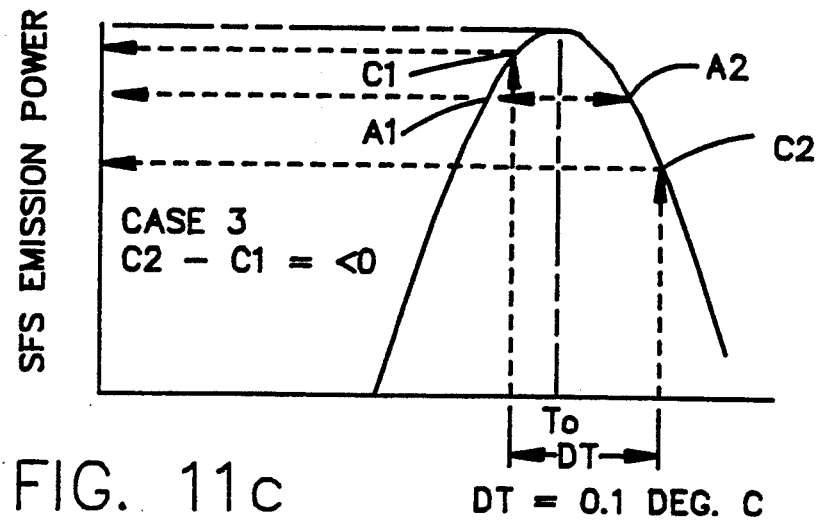
Figure 12:
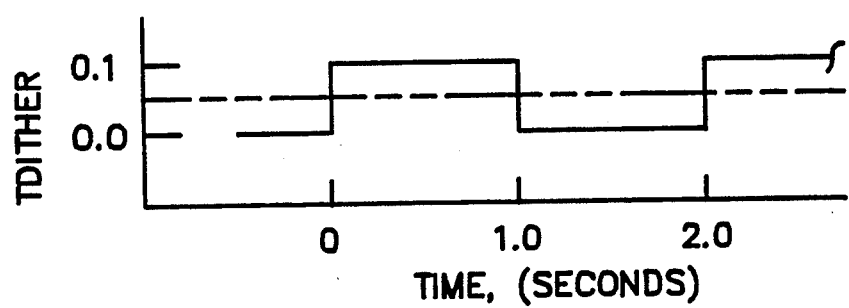
FIG. 12 is a graphical schematic representation of the FDITHER drive voltage from the reference oscillator OSC1 in FIGS. 13 and 14 as a function of time.

The SFS fiber source 52 responds to the variation in pump light source wavelength and provides a corresponding variation in the power of the SFS sense ray 114 sample of the SFS light. FIGS. 11a through 11c show how the SFS emission power varies in response to a variation in the temperature of the pump light source 12 at three different temperatures in synchronization with the reference signal waveform from the OSC1 oscillator in FIG. 13. The OSC 1 reference oscillator 112 is shown and discussed in connection with in FIGS. 13 and 14.

FIG. 11a shows the condition of the dither range DT on the independent variable axis centered at the desired temperature To.

FIG. 11b illustrates the condition of the dither range DT on the independent variable axis being displaced to an operating range centered at a temperature below the desired temperature To. The difference between the amplitude of the SFS emission power at the high temperature limit B2 of the dither range minus the value of the emission power at the low limit of the temperature range B1 results in a positive value.

FIG. 11c shows that the difference between the amplitude of the SFS emission power at the high temperature limit C2 of the dither range minus the value of the emission power at the low temperature limit of the temperature range C1 results in a negative value. The SFS output controller of FIGS. 1 and 3 responds to the variation in the power of the sample of the SFS light at SFS sense ray 114 by adjusting the thermal drive signal ITHERMDV to adjust the operating temperature of the pump light source 12 to maximize the power of the sample SFS sense ray 114.

The stability of the wavelength stabilization apparatus is increased by combining the use of a pump power controller means, discussed above in connection with block 78 in combination with a pump light source temperature control means, such as TEC 88. TEC 88 responds to a thermal drive signal ITHERMDV to control the temperature of the pump light source 12. An output sense and control means, such as SFS output controller 134 discussed above, senses the power of the sample of the SFS light with SFS output detector diode 124 as it is illuminated starting with rays 62, via WDM 40 to fiber 68, to input 108 at output coupler 110, then via fiber 118 as SFS sense ray 114 incident on diode 124.

Diode 124 is a conventional detector diode and may be hermetically mounted in a metal can containing a pre-amp and an input lens through which sense ray 114 is allowed to pass. Detector diodes are sometimes PIN diodes. In the alternative, diode 124 is contained within the SFS output controller 134. For this arrangement, sense ray 114 is extended to include ray 136 entering the SFS output controller 134 to be incident on a detector (not shown).

Figure 13:
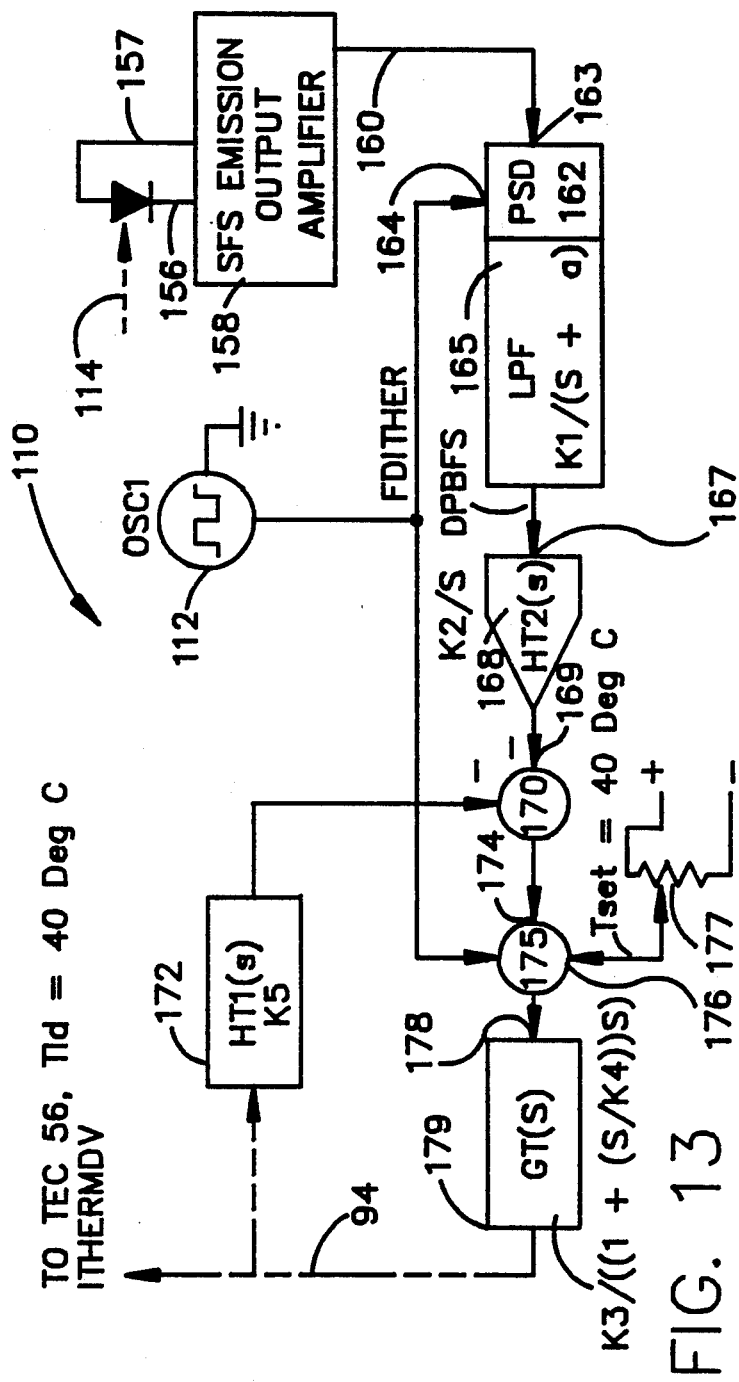
FIG. 13 is a block diagram of an embodiment of the output controller for the control system for stabilizing the wavelength of a broadband super fluorescent light source (SFS)

FIG. 13 shows an embodiment of an SFS output controller 134 or output sense and control process or circuit for receiving the sensed signal, as in FIGS. 1 and 3, via ray 114 via signal lines 156, 157. Block 158 represents an SFS emission output amplifier having a voltage gain typically in the range of 20 to 100. The amplified sense signal is coupled from amplifier output 160 to the input of a PSD (phase sensitive demodulator) 162 at a first input 163. The PSD is referenced to the output of OSC1 by signal FDITHER at second input 164. FIG. 13 shows a typical waveform for OSC1 112 within the circle.

The demodulated output of the PSD 162 is fed to the LPF (low-pass filter) 165. The filtered sense signal is fed to integrator input 167 for integration by integrator HT2(S), 168. The demodulated, filtered, integrated sense signal is coupled to a first subtracting input 169 of adder 170 for subtraction from feedback signal from ITHERMDV via feedback element 172.

The output of adder 170 is coupled to the first input 174 of second adder 175. A predetermined temperature reference signal at second adder input 176 from potentiometer 177 is added with the FDITHER signal from OS1 112 to form a combined signal or the feedback corrected demodulated, filtered, integrated sense signal at the input 178 of the GT(S) block 179. The GT(S) block 179 block filters and integrates the combined signal to form the ITHERMDV drive signal to the TEC 88. Note that the FDITHER signal is imposed on the input of the GT(S) control block 179 at a point that insures that the output of the GT(S) block will contain the dither signal desired.

Figure 14:
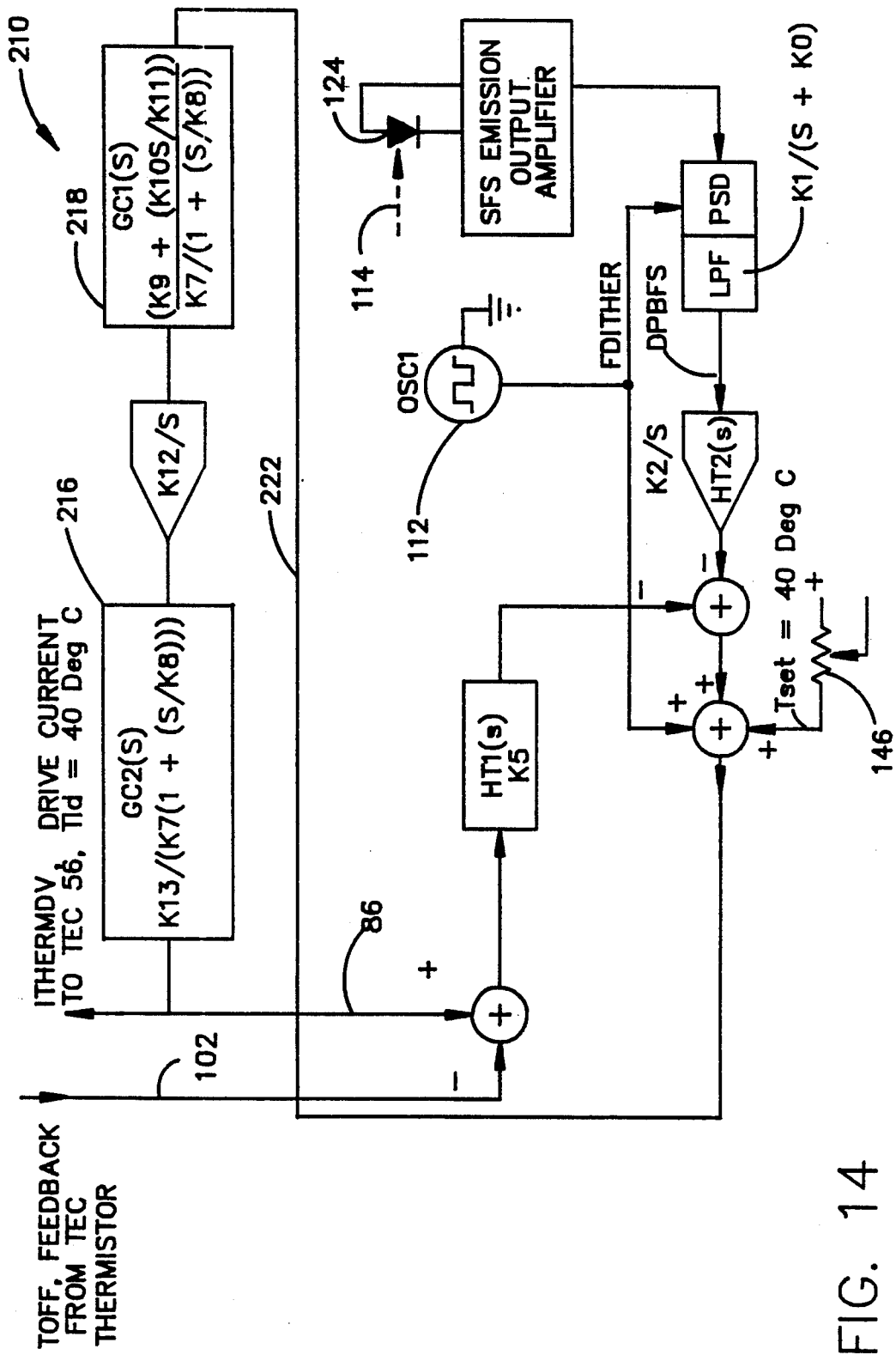
FIG. 14 is a more detailed block diagram of an embodiment of the output controller for the control system for stabilizing the wavelength of a broadband super fluorescent light source (SFS)

The control process 210 of FIG. 14 contains many elements identical to those in the control process of FIG. 11; but, also includes a provision for receiving a temperature feedback signal TOFF from the TEC thermistor 96 on signal line 102. The control process of FIG. 14 also contains compensation block GC2(S) 216 and GC1(S) 218 with compensating poles and zeros introduced to accommodate the response characteristics of the TEC 88 when driven by ITHERMDV on signal line 94. The control process 210 provides a TEC thermal control in accordance with the control signal on signal line 222.

The apparatus of FIGS. 1 and 3 provides a way to practice a method or process for the wavelength stabilization of a superfluorescent fiber source comprising the step of:

A. pumping a SFS (superfluorescent source) to produce SFS light having an SFS wavelength with pump light from a pump light source having a pump light wavelength;

B. sampling SFS light from the SFS and maximizing the power of the sample of SFS light by automatically adjusting the pump light wavelength; and C. repeating steps A and B.

The apparatus of FIG. 10 provides a way to practice the method for stabilizing a superfluorescent source comprising the steps of:

A. producing SFS light from an SFS source having an SFS wavelength by pumping the SFS source with pump light from a pump light source having a pump light wavelength, a first portion of said pump light being absorbed in pumping the SFS source and a second portion of said pump light exiting the SFS source as a residue pump ray; followed by step:

B. sensing the residue pump ray and responding to the residue pump ray to maximize the power of said sample of SFS light by automatically adjusting said pump light wavelength to minimize the power of the residue pump ray.

Accordingly there has been described a wavelength stabilization apparatus and method for a superfluorescent fiber source. Although the invention has been disclosed and illustrated in detail, it is to be understood that the same is by way of illustration and example only and is not to be taken by way of limitation. The spirit and scope of this invention is to be limited only by the terms of the appended claims.

I claim:

1. A wavelength stabilization apparatus for a superfluorescent fiber source comprising:

a SFS (superfluorescent source) means for producing SFS light having an SFS wavelength when pumped with pump light from a pump light source having a pump light wavelength;

an output controller means responsive to a sample of SFS light for maximizing the power of said sample of SFS light by automatically adjusting said pump light wavelength, said output controller means having;

a pump power controller means responsive to a broadband, non-wavelength dependent sample of the pump light from said pump light source for stabilizing the output power of the sample of said pump light with respect to a predetermined reference output power level.

2. The wavelength stabilization apparatus for the superfluorescent source of claim 1 wherein said SFS (superfluorescent source) means further comprises:

an SFS fiber source containing a single mode optical fiber having a core doped with at least one active laser material selected from the group of rare earth materials comprising neodymium or erbium.

3. The wavelength stabilization apparatus for the superfluorescent source of claim 1 wherein said output controller means further comprising:

a pump light source temperature control means responsive to a thermal drive signal for controlling the temperature of the pump light source, and an output sense and control means for sensing the power of the sample of said SFS light and for dithering a thermal drive signal to slightly vary the temperature of the pump light source around an operating temperature, the variation in pump light source temperature resulting in a corresponding variation in pump light source wavelength, said SFS fiber source being responsive to said variation in pump light source wavelength to provide a corresponding variation in the power of the sample of the SFS light, the output sense and control means being responsive to the variation in the power of the sample of the SFS light for adjusting the thermal drive signal to adjust the operating temperature of the pump light source to maximize the power of the sample SFS light.

4. The wavelength stabilization apparatus for the superfluorescent source of claim 3 wherein said pump light source temperature control means further comprises:

a thermoelectric cooler to which the pump light source is thermally coupled; and a thermistor for measuring the temperature of the pump light source and for providing a pump temperature signal corresponding to the temperature of the pump light source; said output sense and control means being further characterized to be responsive to the pump temperature signal for adjusting the thermal drive signal to adjust the operating temperature of the pump light source to maximize the power of the sample SFS light.

5. The wavelength stabilization apparatus for the superfluorescent source of claim 1 wherein said SFS (superfluorescent source) means further comprises an SFS fiber source, and said output controller means further comprising:

a temperature control means responsive to a an SFS temperature control signal for controlling the temperature of the SFS fiber source to correspond with a predetermined fixed value; and a temperature control measuring means coupled to the SFS fiber source for providing said SFS temperature signal.

6. A wavelength stabilization apparatus for a superfluorescent source comprising:

a SFS (superfluorescent source) means for producing SFS light having an SFS wavelength when pumped with pump light from a pump light source having a pump light wavelength, a first portion of said pump light being absorbed in pumping the SFS means and a second portion of said pump light exiting said SFS means as a residual pump ray;

an output controller means responsive to the residual pump ray for maximizing the power of said sample of SFS light by automatically adjusting said pump light wavelength, said output controller means having;

a pump power controller means responsive to a broadband sample of the pump light from said pump light source for stabilizing the output power of the sample of said pump light with respect to a predetermined reference output power level.

7. The wavelength stabilization apparatus for the superfluorescent source of claim 6 wherein said output controller means further comprising:

a pump light source temperature control means responsive to a thermal drive signal for controlling the temperature of the pump light source, and an output residue sense and control means for sensing the power of the residual pump ray and for dithering the thermal drive signal to slightly vary the temperature of the pump light source around an operating temperature, the variation in pump light source temperature resulting in a corresponding variation in pump light source wavelength, said SFS means being responsive to said variation in pump light source wavelength to provide a corresponding variation in pump light source light absorption, the power of the residue ray varying as an inverse function to the power of the SFS light output, the output residue sense and control means being responsive to the variation in power of the residue pump ray for adjusting the thermal drive signal to adjust the operating temperature of the pump light source to minimize the power of the residue pump ray.

8. The wavelength stabilization apparatus for the superfluorescent source of claim 7 wherein said pump light source temperature control means responsive to a thermal drive signal for controlling the temperature of the pump light source further comprises:
a thermoelectric cooler to which the pump light source is thermally coupled; and,
a thermistor for measuring the temperature of the pump light source and for providing a pump temperature signal corresponding to the temperature of the pump light source;
said output sense and control means being further characterized to be responsive to the pump temperature signal for adjusting the thermal drive signal to adjust the operating temperature of the pump light source to maximize the power of the sample SFS light.

9. The wavelength stabilization apparatus for the superfluorescent source of claim 6 wherein said SFS means further comprises:
a doped fiber having a first and second end, the first end being coupled to receive said pump light; and
a dichroic mirror having a reflective surface coupled to said doped fiber second end for passing light at the pump wavelength as a pump residual ray and for reflecting light at the SFS fiber source wavelength into the SFS fiber source; and wherein said output controller means further comprises:
an output residue sense and control means for sensing the power of the pump residual ray exiting the dichroic mirror for dithering the thermal drive signal to slightly vary the temperature of the pump light source around an operating temperature, the variation in pump light source temperature resulting in a corresponding variation in pump light source wavelength, said SFS means being responsive to said variation in pump light source wavelength to provide a corresponding variation in pump light source light absorption, the power of the pump residue ray varying as an inverse function to the power of the SFS light output, the output residue sense and control means being responsive to the variation in power of the pump residual ray for adjusting the thermal drive signal to adjust the operating temperature of the pump light source to minimize the power of the pump residual ray.

10. The wavelength stabilization apparatus for the superfluorescent source of claim 6 wherein said SFS means further comprises:
an SFS fiber source; and wherein said output controller means further comprises:
a temperature control means responsive to a an SFS temperature control signal for controlling the temperature of the SFS fiber source to correspond with a predetermined fixed value; and,
a temperature control measuring means coupled to the SFS fiber source for providing said SFS temperature signal.

11. A wavelength stabilization method for stabilizing a superfluorescent source comprising the steps of:
broadband sampling the intensity of the output of a pump light source that provides a pump light ray and automatically adjusting the output power of the pump light source to maintain substantially constant output intensity of the pump light ray while concurrently;
pumping an SFS (superfluorescent source) with the pump light ray to produce SFS light having an SFS wavelength with pump light from the pump light source having a pump light wavelength;
sampling SFS light from the SFS and maximizing the power of the sample of SFS light by automatically adjusting the pump light wavelength.

12. A wavelength stabilization method for an SFS (superfluorescent source) source comprising the steps of:
broadband coupling a pump light ray with a pump light wavelength from the output of a pump light source to provide a pump monitor light ray and a pump drive ray each light ray having a pump light wavelength;
sampling the intensity of the pump monitor ray and automatically adjusting the output power of the pump light source to maintain substantially constant output intensity of the pump monitor ray while concurrently;
pumping the SFS source with light from the pump drive ray to produce SFS light from the SFS source having an SFS wavelength, a first portion of said pump drive ray light being absorbed in pumping the SFS source and a second portion of said pump drive ray light exiting the SFS source as a residual pump ray;
sampling the residual pump ray; and
maximizing the power of said SFS light by automatically adjusting the temperature of the pump light source to adjust said pump light wavelength to minimize the power of the residual pump ray.

13. A wavelength stabilization apparatus for a superfluorescent fiber source comprising:
a pump light source that provides a pump light ray;
a pump power controller means for broadband sampling the intensity of the pump light ray and automatically adjusting the output power of the pump light source to maintain substantially constant output intensity of the pump light ray;
a wavelength dependent multiplexer coupled to receive the pump light ray and to provide a WDM pump main ray;
an SFS (superfluorescent source) means responsive to the WDM main ray for producing SFS light having an SFS wavelength when pumped with the WDM main ray having a pump light wavelength;
an output controller means responsive to a sample of SFS light for maximizing the power of said sample of SFS light by automatically adjusting said pump light wavelength, said output controller means having;

a pump light source temperature control means responsive to a thermal drive signal for controlling the temperature of the pump light source, and an output sense and control means for sensing the power of the sample of said SFS light and for controlling the thermal drive signal to vary the temperature of the pump light source around an operating temperature, the variation in pump light source temperature resulting in a corresponding variation in pump light source wavelength, said SFS fiber source being responsive to the variation in pump light source wavelength to provide a corresponding variation in the power of the sample of the SFS light, the output sense and control means being responsive to the variation in the power of the sample of the SFS light for adjusting the thermal drive signal to adjust the operating temperature of the pump light source to maximize the power of the sample SFS light.

14. The wavelength stabilization apparatus for the superfluorescent source of claim 13 wherein said SFS (superfluorescent source) means further comprises an SFS fiber source, and said output controller means further comprising:

a temperature control means responsive to a an SFS temperature control signal for controlling the temperature of the SFS fiber source to correspond with a predetermined fixed value; and a temperature control measuring means coupled to the SFS fiber source for providing said SFS temperature signal.

15. The wavelength stabilization apparatus for the superfluorescent source of claim 13 wherein said pump light source temperature control means further comprises:

a thermoelectric cooler to which the pump light source is thermally coupled; and, a thermistor for measuring the temperature of the pump light source and for providing a pump temperature signal corresponding to the temperature of the pump light source; said output sense and control means being further characterized to be responsive to the pump temperature signal for adjusting the thermal drive signal to adjust the operating temperature of the pump light source to maximize the power of the sample SFS light.

16. A wavelength stabilization apparatus for a superfluorescent source comprising:

a pump light source that provides a pump light ray;

a pump power controller means for broadband sampling the intensity of the pump light ray and automatically adjusting the output power of the pump light source to maintain substantially constant output intensity of the pump light ray;

an SFS (superfluorescent source) means for producing SFS light having an SFS wavelength when pumped with pump light from the pump light ray, the pump light ray having a pump light wavelength, a first portion of said pump light being absorbed in pumping the SFS means and a second portion of said pump light exiting said SFS means as a residual pump ray;

an output controller means responsive to the residual pump ray for maximizing the power of said sample of SFS light by automatically adjusting said pump light wavelength, said output controller means having;

a pump light source temperature control means responsive to a thermal drive signal for controlling the temperature of the pump light source, and an output residue sense and control means for sensing the power of the residual pump ray and for adjusting the thermal drive signal to adjust the operating temperature of the pump light source to minimize the power of the residue pump ray.

17. The wavelength stabilization apparatus of claim 16 wherein:

the output residue sense and control means is further characterized to vary the thermal drive signal to provide a variation in pump light source temperature around an operating point, the variation in temperature resulting in a corresponding variation in pump light source wavelength, and wherein;

said SFS means responds to the variation in pump light source wavelength to provide a corresponding variation in pump light source light absorption, the power of the residue ray varying as an inverse function to the power of the SFS light output; whereby, the output residue sense and control means responds to the variation in power of the residue pump ray by adjusting the thermal drive signal to adjust the operating temperature of the pump light source to minimize the power of the residue pump ray.

18. The wavelength stabilization apparatus of claim 16 wherein the SFS means further comprises:

an SFS fiber source; and a dichroic mirror for passing light at the pump wavelength and for reflecting light at the SFS fiber source wavelength into the SFS fiber source; and wherein said output controller means further comprises:

an output residue sense and control means for sensing the power of the residual pump ray exiting the dichroic mirror and for dithering the thermal drive signal to slightly vary the temperature of the pump light source around an operating temperature, the variation in pump light source temperature resulting in a corresponding variation in pump light source wavelength, said SFS means being responsive to said variation in pump light source wavelength to provide a corresponding variation in pump light source light absorption, the power of the residue ray varying as an inverse function to the power of the SFS light output, the output residue sense and control means being responsive to the variation in power of the residue pump ray for adjusting the thermal drive signal to adjust the operating temperature of the pump light source to minimize the power of the residue pump ray.

* * * * *